Figure 1:
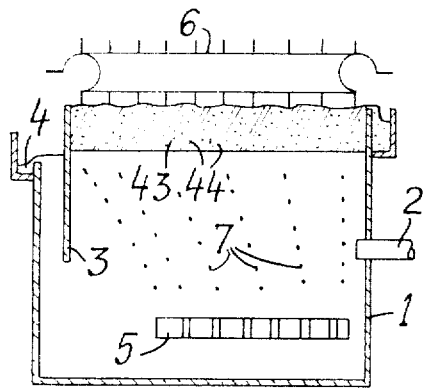

United States Patent [19]

Lewandowski et al.

[11] 3,883,426

[45] May 13, 1975

[54] PROCESS FOR TREATING WASTE WATER

[75] Inventors: Sylvette Odette Rosalie Laurent Lewandowski; Raymond Lewandowski, both of Rennes, France

[73] Assignee: Etudes et Procedes d'Assainissement Purator, France

[22] Filed: July 16, 1973

[21] Appl. No.: 379,907

[52] U.S. Cl. .................................. 201/44; 210/47
[51] Int. Cl. .......................... B03d 1/00; C02b 1/20
[58] Field of Search ................. 210/44, 47, 48, 221; 209/174–176; 204/149

[56] References Cited
UNITED STATES PATENTS 3,347,786  10/1967  Baer et al. ..................... 210/44 X
3,816,276  6/1974  Ichiki et al. ..................... 210/44 X

*Primary Examiner*—Thomas G. Wyse

[57] ABSTRACT

Waste water is purified by means of the flotation process by using aluminum having on at least one surface thereof an amalgam of aluminum and mercury. The hydrogen gas and aluminum produced during the reaction between the waste water and the aluminum amalgam is used to float the impurities to the surface of the waste water being treated, the impurities then being removed and the purified water recovered. Flotation apparatus for carrying out the process is also described.

7 Claims, 9 Drawing Figures

SHEET 1 OF 2

PROCESS FOR TREATING WASTE WATER

The present invention relates to a process for the treatment of spent waters by the use of products produced by reacting water with aluminium amalgam.

At the present time, spent waters can be treated either by biological purification in the case of urban effluents or by physical treatments (decanting, flotation and the like) or by chemical treatments (neutralisation, precipitation and the like) in the case of purely industrial effluents.

It is often impossible to treat mixtures of urban and industrial effluents because of incompatabilities between the products of industrial origin and the biological mass intended for the purification of waters of urban origin. The industrial effluents introduce either poisons or inert but not biodegradable compounds such as, for example, certain emulsified hydrocarbons which disturb the aeration and sedimentation. In every case, even if they do not act as inhibitors of biological reactions, many compounds of industrial origin are not digested and are largely to be found at the outlet of the treatment apparatuses which are not, most of the time, equipped to receive them.

It has now been found, according to the present invention, that it was possible to treat spent waters from all sources by means of the products of the reaction of water with aluminium amalgam.

Aluminium amalgams are known products; their compositions, their structures and their properties have been investigated. It is known in particular that aluminium amalgam can be attacked by water at ordinary temperature and that this attack, carried out between about 0° and 90°C, leads to an evolution of hydrogen and to the formation of a hydrated alumina $Al_2O_3.nH_2O$ with $n$ greater than 3.

It has been found that the attacking reaction of water on aluminium amalgam led to the production of products which are especially suited for the treatment of spent waters.

In the nascent state, the products resulting from the attack are valuable because:

the hydrogen is evolved in the form of micro-bubbles which are very effective for their use in a flotation process, and the alumina has a texture such that it easily absorbs certain impurities in the treated waters, the product resulting therefrom floating easily to the surface of the fluid (under the effect of the hydrogen produced) and thus making treatment of the spent waters by flotation possible.

In the aged state, the alumina produced has a texture and a density such that it carries the impurities in the treated water to the bottom of the treated water, thus making the treatment of spent waters by flotation possible. It is very obviously possible to use one or other of these methods of applying the invention and even to combine them.

In every case, the invention thus uses the products of the reaction of water on an aluminium amalgam; the effect of using aluminium amalgam is:

Firstly, to give rise to products (hydrogen and alumina) which have better properties, and secondly, to prevent a layer of adherent alumina from forming at the surface of the aluminium and rapidly bringing about passivation of this metal.

It is thus essential that the amalgam be produced on the surfaces of the aluminium which have to be attacked by the water; to do this, it is possible continuously to create the surface amalgam, for example, by immersing the aluminium plate in mercury during the period of use; however, it is also possible to produce the amalgam beforehand by reacting the aluminium with mercury or mercury salts and in this case the amalgam can form to a deeper extent in the mass of the aluminium and it is no longer necessary to provide further amounts of mercury during operation.

The method of applying the invention, in accordance with which spent waters are treated by flotation, will now be described.

The principle thereof is simple: an aluminium amalgam, for example, in the form of a plate, is immersed in the water to be treated, and the material which forms at the surface of the water, on the one hand, and the treated water, on the other hand, are collected.

Various embodiments can be used; for example, it is possible to employ:

A flotation apparatus consisting of a tank at one end of which the crude fluid which has to undergo flotation is introduced about half way up and from which the fluid which has undergone flotation is removed through a siphon-type partition, the wall of which descends below the average height of the fluid and which is located at the other end of the tank, in which aluminium plates, treated by means of traces of mercury or of a mercury salt, are placed slightly above the bottom and the majority of which are on the side of the inlet for the crude fluid, a scraping device being placed above the surface of the fluid in the said tank in order to remove the excess thickness of the layer of foam which has floated out, means for adjusting the flow rate of the crude fluid at the inlet to the tank as a function of the thickness of the layer of foam which has floated out and, at the bottom of the tank, means for removing the heavy sludges where appropriate, or a flotation apparatus comprising a main tank possessing, at a first end, an inlet for crude fluid and, at the other end, an outlet for fluid which has undergone flotation, comprising a siphon-type partition, a scraper for removing the excess thickness of foam which has floated out, and an auxiliary chamber comprising, at a first end, a water inlet and, at a second end, an outlet for water containing micro-bubbles, and, in its lower portion, aluminium plates or aluminium scrap treated as indicated above, and, the upper portion of the chamber being closed, a vent which makes it possible for the excess hydrogen to escape, the said water containing micro-bubbles being mixed with the crude fluid at the inlet or in the main tank, or a flotation apparatus comprising a cylindrical tank and an axial tube through which the liquid to be treated is introduced, the said tube being equipped, at its lower end, with a deflector cone which directs the incoming stream of crude liquid upwards, and possessing a radial scraper at the level of the free surface of the foam which has floated out, the said tank containing, at its lower portion, a collection of treated aluminium plates and possessing, at its upper portion, rims for recovering the foams and an aperture at its bottom for removing the liquid which has undergone flotation.

It has been noted, furthermore, that it is possible, to a certain extent, to vary the rate of attack of the aluminium amalgam (and hence the amounts of hydrogen and alumina produced per unit time) by varying the pH of the water reacting with the aluminium. This rate is at a minimum for a pH of the order of 6.8 to 7 but it increases in the case of more acid or basic media.

Moreover, this rate of attack also varies with the temperature of the water and increases with the latter; this is a valuable property of the system according to the invention because the spent waters to be treated are often delivered at a temperature above ambient temperature; the higher is the flow rate of these waters, the more will the temperature of the tank rise and the greater will the activity of the aluminium amalgam be.

It is also possible, within the scope of the present invention, to add, to the waters to be treated, additives which are in themselves known and which facilitate flotation; these additives are, for example, polymers such as a polyacrylamide or surface active agents such as sulphonated fatty constituents or even certain alcohols.

The method of applying the invention, according to which spent waters are treated by flocculation, will now be described.

The principle thereof is simple: pure water and the aluminium amalgam are reacted, hydrogen is evolved and an alumina formed; either the water containing alumina but freed from hydrogen or the pure alumina extracted from the aqueous medium in which the reaction has taken place is then used.

It is generally desirable for the alumina produced to undergo a ripening process, for example, by allowing the temperature of the medium to rise by a few tens of degrees under the effect of the exothermic reaction between the water and the aluminium amalgam.

Figure 2:
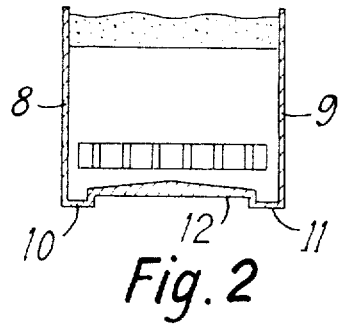
Figure 4:
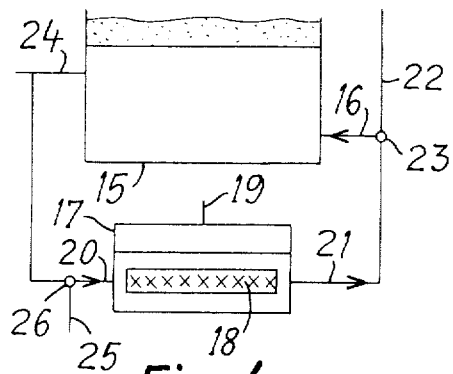
Figure 3:
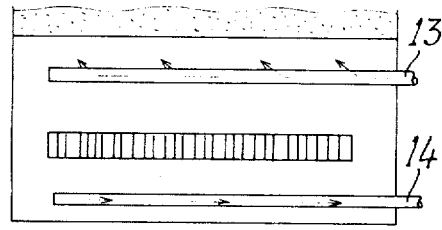
Figure 5:
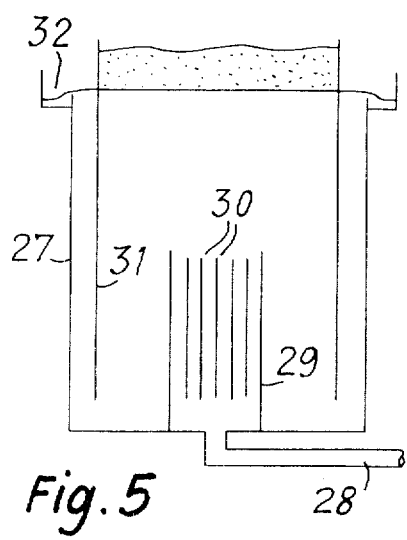
Figure 6:
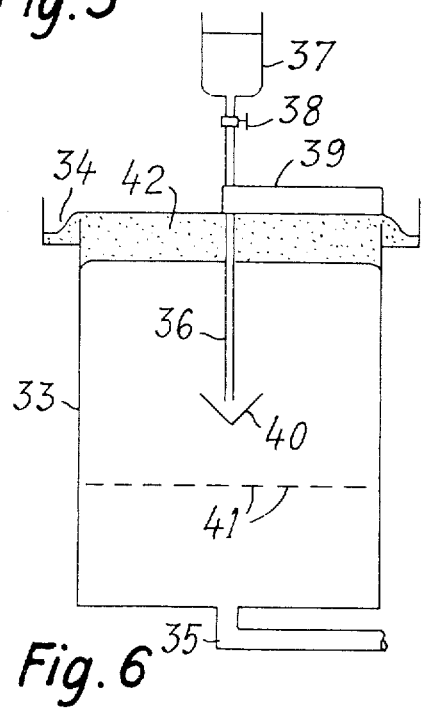
Figure 7:
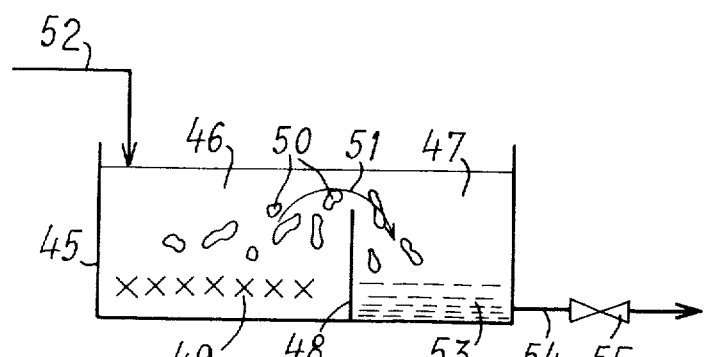
Figure 8:
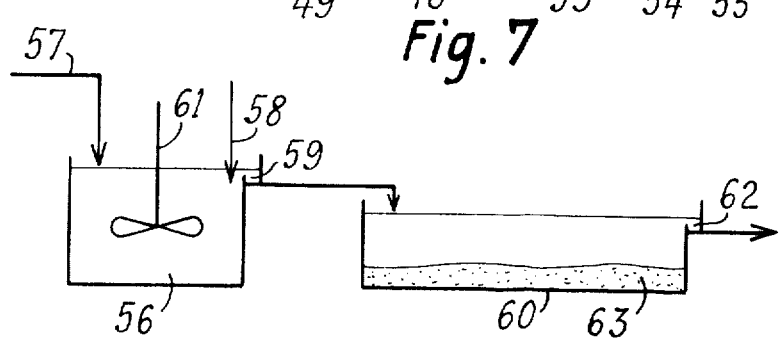
Figure 9:
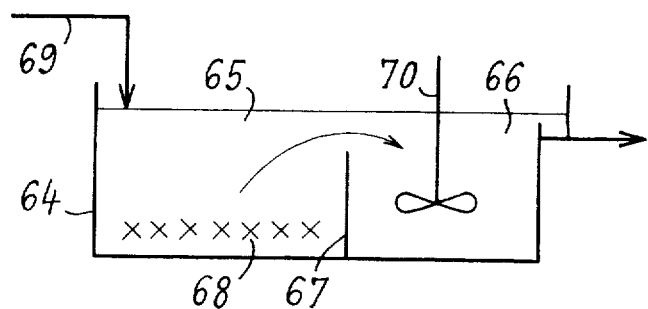

Various embodiments of the invention are represented schematically in FIGS. 1 to 9:

FIG. 1 is a view in longitudinal cross-section of a flotation apparatus according to the invention, FIG. 2 is a view in transverse cross-section of a flotation apparatus of the type of that of FIG. 1, FIG. 3 is a view in longitudinal cross-section of a variant of the flotation apparatus of FIG. 1, FIG. 4 represents a schematic view of a flotation apparatus combined with a generator of micro-bubbles of hydrogen according to the invention, FIG. 5 represents the schematic axial cross-section of a cylindrical flotation apparatus according to the invention, and FIG. 6 represents the schematic axial cross-section of another cylindrical flotation apparatus according to the invention, particularly intended for laboratory experiments and measurements, FIG. 7 represents an embodiment example of a generator of hydrated aluminium oxide sludges, FIG. 8 represents an embodiment example of a purification station using hydrated aluminium oxides according to the invention, and FIG. 9 represents an embodiment example of a purification station in which the hydrated oxides are manufactured "in situ."

In FIG. 1, a tank 1 of rectangular general shape is shown in longitudinal cross-section with the pipeline 2 and the siphon-type partition 3 associated with the outlet channel 4. Slightly above the bottom and particularly on the side of the inlet pipeline 2, that is to say to the right in FIG. 1, aluminium plates 5 are arranged and connected together, for example to form a grid, the meshes of which are vertical surfaces. A foam scraper 6 of conventional type is placed above the tank 1.

Before being introduced into the tank, the aluminium plates 5 have been treated at the surface with traces of mercury or of mercury salts. For example, the treatment can comprise a prior cleaning of the plates with a dilute solution of sodium hydroxide, followed by immersion in a solution of mercuric chloride in hydrochloric acid or in a solution of mercuric nitrate in nitric acid. Treated in this way, the aluminium can attack water to form an aluminium hydrate and hydrogen. The reaction does not stop because the layer of hydrate does not passivate the surface of the aluminium by sticking to this surface, but, on the contrary, detaches itself therefrom continuously in the form of thin layers, and this has the effect of laying the aluminium bare and it continues to attack the water. In practice, the mercury used remains at the surface of the aluminium. In effect, it cannot form any chemical compound and amalgamates again with another particle of aluminium, the amalgam being the active component in the reaction with water. This is very important, because the mercury must be prevented from escaping, which is the case as long as there is aluminium in the flotation tank.

The hydrogen liberated during the reaction forms micro-bubbles 7 which rise to the surface. The distribution of the micro-bubbles in the tank 1 is substantially that represented in FIG. 1 when continuous flotation operation conditions have been achieved, taking into account the flow rate of liquid to be treated at the inlet of the pipeline 2 and of the position of the plates 5. In effect, bubbles must be prevented from passing between the siphon-type partition 3 and the channel 4 because these bubbles no longer play a part in the flotation process and, furthermore, at the surface of the liquid inside the tank 1, the distribution of the bubbles must be as uniform as possible in order to obtain a mass which has floated out of practically constant thickness.

FIG. 2 is a transverse cross-section of a flotation apparatus of the type of that of FIG. 1, the cross-sectional plane passing through the grid of the plates 5. The side walls 8 and 9 of the tank are vertical, and this is suitable, for example, for subjecting a liquid which contains few impurities to the flotation process, in order to obtain a thin layer which has floated out. Moreover, troughs 10 and 11, in which heavy sludges which cannot float out collect, are provided at the bottom of the tank. The collection of the sludges in the troughs 10 and 11 can be facilitated by making the base 12 of the tank not horizontal but having portions which slope towards the troughs. The tank is completed by pumps, which are not shown, which suck up the heavy sludges.

In the case of subjecting a liquid heavily charged with impurities to the flotation process, it would be possible to provide tank side walls which are not vertical but rather slope outwards. This shape then makes it possible to obtain a layer which has floated out which is less thick and is distributed over the entire width of the top of the tank. Moreover, if the walls of the tank are made of concrete, this shape is easier to produce.

FIG. 3 is a longitudinal cross-section of a variant of the flotation apparatus comprising a tank in which there are to be found, going from the top downwards, the layer which has floated out, the inlet pipeline 13 through which the crude fluid is introduced, the network of aluminium plates optionally distributed over the entire cross-section of the tank and the collector 14 which can be branched and which removes the fluid which has undergone flotation. It should be noted that the apertures of the pipeline 13 are preferably pierced on the upper surface of the latter so that the crude fluid flows in the direction of the arrows. The micro-bubbles created by the aluminium plates 5 rapidly carry the liquid or solid particles, carried along by the fluid issuing from 13, towards the layer which has floated out.

FIG. 4 shows a system of two tanks intended for subjecting materials entering the main tank 15 via the inlet 16 to the flotation process. The generator of micro-bubbles comprises a chamber 17 containing aluminium plates or scrap aluminium treated as has been stated above and indicated at 18. With the exception of a vent 19, the chamber 17 is closed at its upper portion; it comprises a water inlet 20 and a water outlet 21. During the reaction of the water passing through 17 with the aluminium 18, bubbles of hydrogen are introduced into the water which issues via 21 and is mixed with the crude fluid conveyed via the pipeline 22 in a mixing valve 23 which can be of conventional design. Thus the liquid which contains material to be floated out and which enters 15 via 16 also contains micro-bubbles. It should be noted that the inlet 16 can, depending on the particular case, be a complex inlet containing several orifices which makes it possible to achieve good distribution of the bubbles in the tank 15. The water introduced into the chamber 17 can be drawn from the outlet 24 of the tank 15 and, before the inlet 20, can be mixed with a basic or acid solution introduced via 25 into the mixer valve 26. Moreover, it is in this case that the auxiliary bubble generator 17 is fully effective. In effect, during experiments, it was possible to note that the quantity of micro-bubbles of hydrogen produced in the reaction of water with the treated aluminium was a function of the pH of the water and increased when the pH moved away from the point of neutrality. Profitable use is made of this observation in the embodiment example of FIG. 4, because the quantity of bubbles produced in the chamber 17 is independent of the pH of the crude liquid entering via the pipeline 22. If, for example, the crude fluid is basic, it is possible to add an acid solution via 25 and 26 to obtain good evolution of bubbles, and the acid added will neutralise the basic character of the crude fluid in 15. This neutralisation in situ has the advantage of causing additional coagulation. In effect, at the outlet of the generator 17, the water carries not only bubbles but also $Al^{+++}$ ions if the pH of 17 is acid, or $AlO_2^-$ (aluminate) ions if the pH of 17 is alkaline. In both cases, the neutralisation by mixing gives rise to a chemical floc:

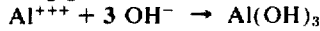
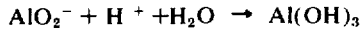

Flocculation, flotation and neutralisation will thus have been achieved simultaneously, in order to obtain neutral water which has undergone flotation at the outlet 24. The vent 19 makes it possible to remove the excess hydrogen directly.

FIG. 5 shows another embodiment example comprising a tank, for example a cylindrical tank, 27 with an inlet 28 at the bottom of the tank for the crude liquid, a compartment which generates micro-bubbles, defined by a partition 29, and which contains treated aluminium plates or treated scrap aluminium 30, a flotation zone defined by the siphon-type partition 31 and a channel 32 for recovering the liquid which has undergone flotation. This arrangement can make it possible to profit from the geometry of revolution in order to improve the distribution of the micro-bubbles under the foam which has floated out.

FIG. 6 shows another embodiment example which is particularly suitable for laboratory experiments and/or measurements. The tank 33 can be a simple glass vessel 33 equipped with a channel for recovering the materials which have floated out 34 and containing an outlet tube 35 at the bottom of the vessel. The crude liquid is introduced via a vertical axial tube 36 surmounted by a supply vessel 37, the rate of introduction being adjusted by a tap 38. The tube 36 can serve as an axle for a motor driving a scraper 39. A deflector 40 is mounted at the lower part of 36, to which it is firmly fixed by any means whatsoever which are not shown. Finally, aluminium plates 41 are arranged below the deflector 40, it being also possible for these plates of treated aluminium to be firmly fixed to the tube 36 by any means whatsoever which are not shown. In this latter case, which is very useful for experiments, the vessel 33 can be an ordinary transparent vessel and the outlet 35 can be replaced by conventional siphons which take the water which has undergone flotation from the bottom of the vessel. In the example of FIG. 6, the crude liquid enters 33 via the bottom of 36, the entering stream is directed upwards by the deflector 40 which facilitates flotation and the liquid which has undergone flotation is removed via the tube 35. If the vessel 33 is made of glass, it is very easy to observe the behaviour of the materials which have undergone flotation and the structure of the mixture of materials which have undergone flotation and of the foam 42.

In FIG. 1, the foam which has floated out 43 has been represented distributed between partitions 44. These partitions 44 can also be made of aluminium which has been very slightly treated, which, by creating bubbles within the foam, improves the flotation of the layer of foam. The partitions 44 are substantially vertical or inclined as shown in FIG. 1 in the direction of movement of the scraper 6 which, in the example shown, scrapes from left to right.

When the aluminium is used in the form of plates such as the plates 5, that is to say plates which are arranged vertically, both faces of the plates can be activated by mercury, the different structures corresponding to the geometry of the tank; a rectangular grid in a rectangular tank, radiating or spiral structure in a geometry of revolution, and the like. When the aluminium is used in the form of horizontal plates such as the plates 41 shown in FIG. 6, it is preferable to cover the lower face with a lacquer or with another protective coating in order to prevent the bubbles formed below from agglomerating and rising in the form of large bubbles which would disturb the cake of foam which has floated out.

In FIG. 7, the hydrated aluminium oxide sludge generator consists of a tank 45 of rectangular general shape, divided into two receptacles 46 and 47 by a partition 48. Fragments or plates of aluminium 49 are located slightly above the bottom of the receptacle 46. These fragments or these plates can, for example, consist of waste from machining processes.

Before being introduced into the receptacle 46, the aluminium fragments or plates have been treated at the surface with traces of mercury or of mercury salts. For example, the treatment can comprise a prior cleaning of the plates with a dilute solution of sodium hydroxide followed by immersion in a solution of mercuric chloride or in a solution of mercuric nitrate in nitric acid. When treated in this way, the aluminium can attack water to form an aluminium hydrate and hydrogen. The reaction does not stop because the layer of hydrate does not passivate the surface of the aluminium by sticking to this surface, but, on the contrary, detaches itself therefrom continuously in the form of thin layers. This has the effect of laying the aluminium bare and it continues to attack the water. In practice, the mercury used remains at the surface of the aluminium. In effect, it cannot form a chemical compound and amalgamates again with another particle of aluminium, the amalgam being the active component of the reaction with water. This is very important, because the mercury must be prevented from escaping and this is not possible as long as there is aluminium in the receptacle 46.

The thin layers or filaments of hydrated oxides, which detach themselves from the surface of the aluminium, are carried away by an ascending turbulence caused by the evolution of hydrogen and form flakes 50. The flakes 50 follow the path indicated by the arrow 51 above the partition 48.

The reaction water is introduced into the receptacle 46 via a pipeline 52, and this creates a stream towards the receptacle 47.

In the receptacle 47, the flakes undergo sedimentation and form a sludge 53 which is removed via a pipeline 54 equipped with a valve 55, the outlet of which is connected, for example, to an apparatus for using hydrated aluminium oxide sludges. The flow rate of the pipeline 52 must obviously be under the control of that of the valve 55 in order to prevent any overflow.

Instead of being conveyed directly to an apparatus in which they are used, the sludges 53 can supply a drying apparatus in which they are dried to give a white powder which can be stored in sacks. When they are to be used, it then suffices to pour the hydrated oxides into water in order to form flakes again which have properties of coagulants, absorbants and precipitation agents.

It should be noted that the flow rate of the outlet valve 55 determines, as a function of the volume of the tank 45, the age of the sludges and it will be seen, in the text which follows, that, in order to obtain an optimum yield with certain effluents, it is preferable to use sludges of a definite age. In this case, the receptacle 47 will be equipped with a stirrer which will ensure a uniform concentration of hydrated oxides.

If the receptacle 46 is heat insulated, since the reaction between aluminium and water is exothermic, the temperature of the mixture in the receptacle will increase and this will cause the sludges to mature.

A purification station in which the hydrated aluminium oxides of the invention are used has been represented schematically, in cross-section, in FIG. 8. The effluent to be treated, which can be an industrial, urban or mixed effluent, enters the tank 56 via the pipeline 57. The hydrated oxide sludges coming, for example, from the valve 55 of FIG. 7 enter via the pipeline 58. The channel 59 supplies a second tank 60 with the mixture of effluent and hydrated oxide flakes. The tank 60, in FIG. 8, is a sedimentation tank on the bottom of which the majority of the polluting components coagulated by the flakes, or absorbed by them, or precipitated, is deposited. The tank 56 is equipped with a stirrer 61 which ensures that the hydrated oxides and the effluent are mixed intimately. On the tank 60, a channel 62 conveys a clear liquid towards a receiving medium or towards a biological finishing post. The materials 63 which have undergone sedimentation to the bottom 60 are removed from time to time, as in any sedimentation tank.

When hydrated oxides in the form of powders in sacks are used, it is obviously possible to pour them directly into the tank 56 where the powder is diluted and forms flakes again. However, in this way, there is not a continuous control over the formation of the flakes and it is preferable to carry out the dilution in a separate tank containing a separate pipeline connected to the inlet 58.

In FIG. 9, the tank 64 comprises two receptacles 65 and 66 separated by a partition 67. Fragments or plates of aluminium treated, as has been seen above, with mercury or with mercury salts, are provided at 68 slightly above the bottom of the receptacle 65. The pipeline 69 introduces the effluent to be treated directly into the receptacle 65 where the water of the effluent reacts "in situ" with the aluminium 68. The receptacle 66 is equipped with a stirrer 70 which, in practice, plays the same role as the stirrer 61 of FIG. 8. In the receptacle 65, agitation is kept up by the evolution of hydrogen. The stream of effluent carries the mixture towards the receptacle 66, the volume of which decides the time of contact of the effluent with the hydrated oxides, that is to say the degree of purification.

In the case where the effluents to be treated consist of soluble hydrocarbons, the stirrer 70 will advantageously be replaced by a turbine which rotates at high speed, located near the surface to bring about dispersion of the air bubbles in the liquid phase. If the turbine is deeply immersed, it is preferable to inject air in its vicinity. The mixture of hydrocarbons and hydrated oxides is then directed towards a simple settling tank where a rapid flotation takes place.

A. Description of a process for the activation of aluminium plates

Aluminium plates can be activated and used, for example, by immersing the aluminium plates vertically in narrow channels containing mercury, located at the bottom of the receptacles. The mercury diffuses gradually along the surfaces of the plates and, on contact with water, micro-bubbles of hydrogen and alumina, which can be used according to the invention, form.

This diffusion of the mercury takes place vertically over the course of a few hours, at the end of which the diffusion front reaches the stationary height of 13 to 14 cm.

In order to avoid this latent stage at the start, it suffices to activate the plates by immersing the latter briefly in a solution of a mercuric salt. The aluminium can then be wetted by mercury as is shown by the angle of the Al - Hg junction, which is inverted relative to normal aluminium. The diffusion of Hg is then rapid, there is no interruption in the evolution of micro-bubbles and the flotation apparatus is operational as soon as the activation has been carried out.

A plate of 3 mm thickness is thus completely consumed in 6.5 × 24 hours without interrupting the operation. The duration of operation of the apparatus can be raised to several months:

either by means of thicker plates, or by installing plates which are finer but which are of sufficient height. The consumption of aluminium at the base causes the plates to fall gradually.

It is possible to stop the evolution of gas by covering the plates with a receptacle in which the hydrogen of the reaction is retained.

The plates escape contact with the water, and the flotation apparatus is stopped.

Removal of the receptacle causes the flotation apparatus to start up again immediately.

The hydrogen can be replaced by an inert gas (nitrogen) injected from outside.

The following non-limiting tests have been carried out:

B. Treatment of waters by flotation

EXAMPLE 1

An effluent from a tallow factory was treated, without prior flocculation, in an apparatus such as that of FIG. 6. All the greases present in this effluent were recovered at the surface with the alumina produced; the latter absorbed a large part of the dissolved or colloidal substances present in the effluent. The reduction in the "chemical oxygen demand" reached 40% relative to the known treatments and could reach 60% if the greases had not been emulsified beforehand by a centrifugal pump or a surface active agent.

EXAMPLE 2

An effluent from a meat preserving factory was introduced into a flocculation apparatus into which aluminium sulphate was injected, together with calcium hydroxide in order to increase the pH thereof. After a 20 minute period of contact, the effluent was introduced into a flotation apparatus such as that represented in FIG. 1.

The water which had undergone flotation was freed from the materials suspended in it which were retained in the layer which had floated out. The degree of reduction of the "chemical oxygen demand" reached 70%. If the effluents contain fatty constituents almost exclusively, the degree of reduction of the "chemical oxygen demand" can reach 95 to 97%. The layer obtained which had floated out was stable for several days.

EXAMPLE 3

Effluents from spraying booths containing paints were admitted into a preliminary flocculation apparatus together with suitable amounts of ferric chloride. The original slight alkalinity of these effluents made it unnecessary to compensate for the acidity of the ferric chloride by means of a basic reagent. The flocculated effluent was admitted into a flotation apparatus according to the invention. The proportion of materials in suspension in the treated water was less than 25 ppm. The "chemical oxygen demand" of the water thus treated was reduced to that corresponding to the solubility of the solvents which were not absorbed by the ferric hydroxide. The finishing process can be carried out on active charcoal but is not necessary if the ferric chloride used in the preliminary stage is replaced by alumina originating, according to the invention, from an attack of water on an aluminium amalgam. The layer which floated out was very stable and had not changed 3 weeks after it was scraped off.

C. Treatment of waters by flocculation

The aluminium hydroxide sludges were produced by the attack of water on aluminium amalgam. The ageing operations mentioned in the examples below consisted of a storage (or sedimentation) for periods which varied from a few tens of minutes to several hours depending on the temperature of the attack of the water on the aluminium. If this attack took place at a temperature close to ambient temperature, the ageing process would take several hours; if, on the other hand, the attack took place at a temperature between 50° and 70°C, the ageing process was much more rapid (a few tens of minutes).

EXAMPLE 4

In an installation of the type of that of FIG. 8, an effluent from an abattoir was mixed continuously with hydrated oxides prepared in the apparatus of FIG. 7 and removed immediately from the receptacle 47. The sludgy mass issuing from the tank 56 was subjected to sedimentation in the tank 60. The treated water no longer contained materials in suspension or colloidal materials.

Furthermore, in a similar experiment, a flotation tank was used instead of the sedimentation tank 60, after the tank 56, and the same results were obtained.

EXAMPLE 5

Example 4 was repeated on effluents from an abattoir with hydrated oxides prepared in the apparatus of FIG. 7, but which, on this occasion, had remained on average for 3 days in the receptacle 47 before being removed. It was possible to show that the same results were obtained as in Example 4, but by using 2 to 3 times smaller amounts of hydrated oxides.

As far as the ageing of the oxide sludges was concerned, it was found that the dwell time in the preparation apparatus increased the activity of the sludges, that is to say made it possible to use less of them in order to obtain the same result. However, after a dwell time of three days, it appeared that the maximum activation had been achieved.

It should also be noted that this ageing could be accelerated by allowing the temperature of the preparation medium to increase, which could be achieved easily by heat insulating the receptacle 46 because reaction was exothermic. It was then obviously necessary to provide means for controlling this rise in temperature. It should be noted also that this heating made it possible to reduce the subsequent optional drying period.

EXAMPLE 6

Example 1 was repeated with effluents from an abattoir which had been mixed beforehand with emulsified hydrocarbons. It was possible to show that the reaction rates increased and that the treated effluent no longer contained materials in suspension or colloidal materials or hydrocarbons. In particular, the floc formed reached larger dimensions.

EXAMPLE 7

An effluent containing soluble hydrocarbons — for example, such as those originating from machine tools, — at a concentration of 1,000 ppm, phosphates — for example, originating from a phosphatisation tunnel, — at a concentration of 10 ppm, expressed as $PO_4^{---}$ ions, and organic dyestuffs — for example, of the type of Cresol Reds — was treated in the apparatus of FIG. 9.

After sedimentation, the treated effluent was colourless; it no longer contained any hydrocarbons and its phosphate content, expressed as $PO_4^{---}$ ions, was less than 100 micrograms per litre. The rate of sedimentation was a few tens of metres per hour.

If, in this same example, the effluents introduced contained copper, for example in the form of 5 to 70 ppm of $Cu^{++}$ ions, it was found that, after treatment, the water obtained did not contain more than a few micrograms of copper per litre.

What is claimed is:

1. A process for treating waste water to remove impurities therefrom, which comprises contacting in a flotation zone said waste water and aluminum having on at least one surface an amalgam of aluminum and mercury, allowing said waste water to react with said amalgam to form hydrogen gas and alumina in situ, removing from said zone impurities that have been carried to the surface of the waste water by the evolved hydrogen gas and alumina, and recovering purified waste water.

2. A process according to claim 1, in which the aluminum is in the form of a plate having the amalgam on at least one surface thereof.

3. A process according to claim 1, in which the waste water is an industrial waste water.

4. A process according to claim 1, characterised in that alumina resulting from the reaction of an amalgam of aluminum and mercury with water is introduced into said zone as a flocculating agent.

5. A process according to claim 4, characterised in that the alumina is "matured" by being stored in water for a period of at least 10 minutes prior to use.

6. A process according to claim 5, characterised in that the "matured" alumina is dried and stored before being used as a flocculating agent.

7. A process according to claim 4, characterised in that the reaction between said amalgam and water is carried out at a temperature of between about 50° and 70°C.

* * * * *